US007522063B2

(12) United States Patent
Ehlers

(10) Patent No.: US 7,522,063 B2
(45) Date of Patent: Apr. 21, 2009

(54) COMBINATION THERMOSTAT AND WARNING DEVICE WITH REMOTE SENSOR MONITORING

(75) Inventor: Gregory A. Ehlers, Dacula, GA (US)

(73) Assignee: Ranco Incorporated of Delaware, Wilmington, DE (US)

( * ) Notice: Subject to any disclaimer, the term of this patent is extended or adjusted under 35 U.S.C. 154(b) by 430 days.

(21) Appl. No.: 11/456,697

(22) Filed: Jul. 11, 2006

(65) Prior Publication Data

US 2007/0013532 A1 Jan. 18, 2007

Related U.S. Application Data

(60) Provisional application No. 60/698,782, filed on Jul. 13, 2005.

(51) Int. Cl.
*G01W 1/00* (2006.01)

(52) U.S. Cl. ....................... 340/601; 340/602; 340/522; 340/286.01; 340/539.26; 379/43; 379/48

(58) Field of Classification Search ................. 340/540, 340/601, 602, 628, 632, 517, 521, 522, 286.01, 340/286.04, 286.05, 286.11, 539.26, 310.11, 340/7.48, 905; 379/43, 48
See application file for complete search history.

(56) References Cited

U.S. PATENT DOCUMENTS

| | | | | |
|---|---|---|---|---|
| 4,088,986 | A * | 5/1978 | Boucher | 340/521 |
| 4,211,362 | A * | 7/1980 | Johnson | 236/47 |
| 4,429,299 | A * | 1/1984 | Kabat et al. | 340/310.16 |
| 5,361,982 | A * | 11/1994 | Liebl et al. | 236/46 R |
| 5,781,852 | A | 7/1998 | Gropper | |
| 5,798,945 | A * | 8/1998 | Benda | 702/24 |
| 5,978,738 | A | 11/1999 | Brown | |
| 6,121,885 | A * | 9/2000 | Masone et al. | 340/628 |
| 6,177,873 | B1 * | 1/2001 | Cragun | 340/601 |
| 6,204,761 | B1 * | 3/2001 | Vanderable | 340/539.28 |
| 6,529,904 | B1 | 12/2001 | Lamb | |
| 6,484,951 | B1 * | 11/2002 | Mueller | 237/2 A |
| 6,710,715 | B2 * | 3/2004 | Deeds | 340/601 |
| 6,747,557 | B1 * | 6/2004 | Petite et al. | 340/540 |
| 6,798,341 | B1 * | 9/2004 | Eckel et al. | 340/521 |
| 7,145,466 | B2 * | 12/2006 | Haynes et al. | 340/628 |

(Continued)

*Primary Examiner*—Toan N Pham
*Assistant Examiner*—Travis R Hunnings
(74) *Attorney, Agent, or Firm*—Howard & Howard Attorneys PLLC

(57) ABSTRACT

A combination thermostat and warning device that is housed within a common housing, such as a housing resembling that for a conventional thermostat. The combination device includes a controller that is operable to control the operation of a climate control device, such as an HVAC system. The combination thermostat and warning device includes a radio receiver that is disposed within the common housing and receives warning radio broadcasts from a remote source, such as the National Oceanic and Atmospheric Administration (NOAA). The controller of the combination thermostat and warning device controls the generation of a warning alarm by an alarm indicator based upon the warning radio broadcast to alert occupants of the warning broadcast. The warning alarm can be generated by an alarm indicator included within the common housing or can be generated by remote devices, such as hazardous condition detectors or other alarm system. The combination thermostat and warning device includes a transceiver that can both broadcast messages to remote devices and receive information from remote devices, such as remote temperature sensors.

34 Claims, 1 Drawing Sheet

U.S. PATENT DOCUMENTS 7,339,467 B2 * 3/2008 Lamb ...................... 340/539.1
2001/0043144 A1 * 11/2001 Morris ...................... 340/692
2002/0024424 A1 * 2/2002 Burns et al. ............ 340/310.01
2006/0031180 A1 * 2/2006 Tamarkin et al. ............ 705/412

* cited by examiner

COMBINATION THERMOSTAT AND WARNING DEVICE WITH REMOTE SENSOR MONITORING

CROSS REFERENCE TO RELATED APPLICATION

The present application is based on and claims priority to U.S. Provisional Patent Application Ser. No. 60/698,782, filed on Jul. 13, 2005.

FIELD OF THE INVENTION

The present invention relates generally to electronic warning devices, and more specifically to a combination thermostat and severe weather warning device. The combination device houses a conventional thermostat control circuit and an FM radio that receives area-specific severe weather alerts and broadcasts from the National Oceanic and Atmospheric Administration (NOAA), according to the area of concern. The thermostat is part of an integrated home system and communicates using wireless communication techniques (RF) with other home devices, such as smoke and CO detectors, to generate alarm signals.

BACKGROUND OF THE INVENTION

Most, if not all, areas of the country have building codes requiring that smoke detectors or smoke alarms be installed in almost all structures, at least of new construction. The installation of such devices has proven to be a life saving measure, as the warning provided can often alert persons within the structure to evacuate the structure in a timely manner.

In current homes, thermostats are provided that can communicate wirelessly with various devices in the home, such as smoke detectors, CO detectors, air dampers, water heater controls, furnace controls and other devices that may or may not be line powered including remote sensors, systems and appliances. The thermostat can function as a central controller for the home and can communicate information to and from the other devices wirelessly, typically using RF communication or may be a node on an in-home network that intercommunicates with other devices. In either case, the network can be a point-to-point, star, mesh or any other suitable network infrastructure that uses RF, Powerline, infra-red or any other media that is deemed to be reliable and sufficient to meet the needs of the system.

Severe weather, particularly localized and rapidly forming weather such as tornadoes, also takes a toll of life in many areas. Accordingly, the National Oceanic and Atmospheric Administration (NOAA) has implemented an FM radio network across the U.S. to provide severe weather warnings on a region or area-specific basis.

In 1994, the weather warning system was improved by implementing "Specific Area Message Encoding" (SAME), in which each broadcast is preceded by a "Federal Information Processing System" (FIPS) code. Weather radios with this system include means for setting the receiver to be activated only by a specific code. Thus, a severe weather warning broadcast intended to cover only a certain area (e.g., a county), will be preceded by a "FIPS" code only for that county. Only radios that have been set to be activated by that specific code will be activated by the broadcast to produce a suitable alarm and/or voice broadcast of the severe weather warning.

However, relatively few people have purchased, or have access to, such weather warning radios, for various reasons.

Yet, severe weather which hits an area at night can be tragic in terms of loss of life. The provision and use of such radios, particularly those using the "SAME" system of regionally coded messages, could do much to save lives in such situations.

Accordingly, a need will be seen for an emergency warning device which combines the features of a thermostat and severe weather warning radio. The device provides a single, central receiving device for sudden emergency situations and can provide a signal to an alarm-type device, such as but not limited to a smoke or CO detector, to provide an audible alarm or to a vibrating or visual alarm strobe device to alert those who might be hearing impaired, in the event of severe weather in the area. Preferably, the thermostat including the emergency warning device and any peripheral alarm nodes is powered by standard household electrical power and includes backup battery power.

SUMMARY OF THE INVENTION

The present invention comprises a combination thermostat and severe weather warning device, which is preferably permanently installed in a home or other structure. The combination device is housed in a common housing that may have the appearance of a conventional thermostat, but includes the electronic circuitry for a radio receiver for receiving severe weather broadcasts and alarms over any of the standard VHF FM frequencies used by the National Oceanic and Atmospheric Administration (NOAA) for broadcasting such weather information. The device preferably utilizes electrical energy from the conventional electrical supply for the home, but also preferably includes backup electrical battery power in the event that the electrical power is interrupted.

Emergency warning systems have existed for centuries. Community wide systems of sirens, church bells and other means of providing large geographic area alerts, while effective at times, fall short of the providing immediate and complete coverage to all residential, commercial and public facilities. To improve coverage, the National Weather Service, as an example, had the FCC allocate a designated frequency nationwide over which the National Weather Service can transmit weather alerts for things like hail, tornados, floods or other naturally occurring severe weather conditions.

In accordance with the present invention, a communicating thermostat for residential and commercial use has been developed that incorporates a link to NOAA Weather radio, so that the thermostat in the home becomes an alarm point for severe weather conditions as well as being a portal for national safety and security. To support this national portal concept, weather will not be the only alert traffic carried by the system. Homeland Security alerts can also use this system to issue alerts in the case of any terrorist activities. In addition, the system will easily support local alerts like "Amber" alerts, which have recently increased in number and intensity.

The thermostat in the home would become a data display terminal and alarm activation point for severe weather and other alerts issued by NOAA. These alerts are coded to define the specific geographic area they are for to eliminate any false conditions being triggered.

Alarms from NOAA would trigger the communicating thermostat to use both audible and visual means, if available, to draw attention to its display screen on which text data issued by the National Weather Service could be displayed. Optionally, a voice message may also be transmitted over the NOAA network and made available through audible means in the home. In addition, the receipt of an alert from NOAA will cause the thermostat to communicate the alarm signal to the smoke/CO detector system in the home to at a minimum generate a unique alarm, which can be audible or visual, or a combination of both. The alarm signal could utilize the same annunciator means as the standard smoke alarm, but would preferably generate a different alarm pattern from that of the standard smoke or CO alarm pattern.

Since the communicating thermostat has a flexible "in premise" communications capability, the thermostat is capable of sending a general alarm RF transmission within the premise to other devices. These devices, if properly enabled with an RF receiver, would act as repeaters or additional alarm points in the home to ensure a complete alarm notification network. These devices would be things like smoke detectors, doorbells, security alarms systems, alarm clocks or could be stand alone or a specialized alarm device as an example. Any device capable of generating either visual or audible alarms would be a candidate.

In addition to communications related to public safety, including homeland security communications, it is contemplated that the FCC could provide access to this same NOAA frequency or family of frequencies for the transmission and distribution of energy related information and services.

In addition to the NOAA radio contained within the thermostat, the combination thermostat can also include control elements that allow the thermostat to be a fully functional residential/light commercial thermostat that incorporates data from remote, wireless temperature and humidity sensors located both inside and outside the home. Thus, the combination thermostat would be able to function as a weather station in addition to its operation as a thermostat and emergency warning device.

The wireless weather station thermostat preferably would be able to operate with at a minimum of three remote temperature sensors located either within the building or outside. These remote sensors would primarily be temperature measurement points but could include other types of sensors like humidity, wind, rain or UV radiation sensors at a minimum. The thermostat includes the ability to perform temperature or other environmental controlling functions based upon any one of the remote sensors. As an example, during the day the thermostat can be configured to control the temperature within a building based upon a temperature sensor in the main floor of the residence. However, during nighttime, sleeping hours, the thermostat can be configured to utilize a temperature sensor contained within bedrooms on a different floor such that the temperature within the home is monitored based upon where the occupant resides.

In addition, the management and control of humidity levels can also be performed in an optional implementation. In another implementation, the thermostat can use the average of all the indoor remote sensors to control the environmental conditioning system in the home. The display of the combination thermostat can be configured to not only present the internal temperature within the building, but also can be configured to display the temperature from each of the remote sensors. Thus, if one of the sensors is positioned outside, the combination thermostat would allow for monitoring of the outside air temperature.

In addition to its environmental control capabilities, the thermostat can accept and react to price signals received by the radio receiver that relate to the cost of energy from an energy provider. This price responsive capability allows the thermostat to manage the largest energy-consuming device in the home, the environmental conditioning system or systems. As an extension of this price responsive capability, the thermostat can use the in-home network, and act as the central reception point for utility pricing data. It can then distribute that data to other price responsive appliances using the in-home network, creating a household level energy management system capable of meeting the needs of the new energy marketplace. It is contemplated that the energy pricing information would be received by the radio receiver and may be transmitted on the same Federally licensed frequency as the NOAA alerts.

BRIEF DESCRIPTION OF THE DRAWINGS

The drawings illustrate the best mode presently contemplated of carrying out the invention. The drawing FIGURE is a schematic block diagram of the combination thermostat and warning device.

DETAILED DESCRIPTION OF THE INVENTION

Figure 1:
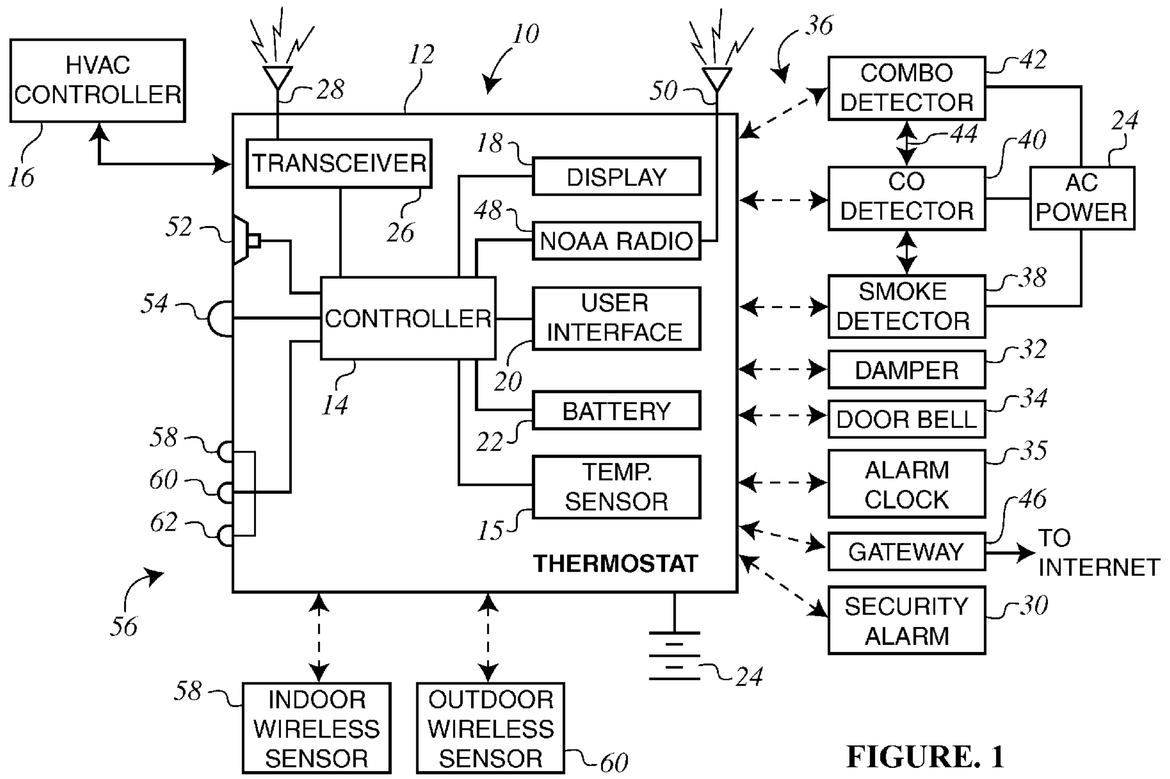

The present invention comprises a combination thermostat and warning device 10, with all internal components being contained within a common housing 12. The drawing FIGURE provides a block diagram of the basic and optional componentry of the present invention, including the common housing 12. It should be understood that the housing 12 may have any appearance or configuration as desired, so long as appropriate conventional apertures, openings, and/or passages are provided for access to such internal components as function controls, battery access for replacement, connections for external or remote components, etc. as desired.

As illustrated in the FIGURE, the combination thermostat 10 includes a central controller 14 that controls the operation of the normal thermostat functions, such as monitoring the temperature and or humidity in the area immediately surrounding the thermostat as sensed by the temperature/humidity sensor 15 and controlling the operation of a climate control device, such as but not limited to an HVAC controller 16 as is conventional. Controller 14 provides signals to a display 18 and receives input from a user through a user interface 20. The user interface 20 can take many different forms, such as a push button input panel or any other type of device that allows the user to input information to the controller 14.

In the embodiment shown in the FIGURE, the combined thermostat 10 includes a battery backup 22 that allows the thermostat 10 to operate upon loss of the AC line power 24. In the embodiment of the invention illustrated, the thermostat 10 includes a transceiver 26 that allows the thermostat 10 to communicate with various other devices within the home. The transceiver 26 is able to communicate through an antenna 28 to various other devices, such as a security alarm 30, a remote damper 32, a door bell 34, an alarm clock 35 and a hazardous condition detector system 36 installed within the home.

The hazardous condition detection system 36 can include multiple hazardous condition detectors, such as but not limited to a smoke detector 38, a CO detector 40 and a combination CO/smoke detector 42. As illustrated, each of the detectors 38-42 communicate with each other through a suitable network interconnect system 44 such that an alarm detected at any one of the detectors 38-42 triggers the generation of an audible alarm at all of the other interconnected devices. The network must be reliable and must meet local building code requirements and could be either hard wired, physical or RF in nature. Each of the detectors 38-42 is connected to the AC line voltage 24 and also preferably includes a battery backup. Thus, should power be lost during a severe weather condition, each of the detectors 38-42 is able to continue to function after the loss of the AC power 24.

Preferably, each of the detectors 38-42 can function as either an annunciator or a repeater, or both, to communicate an alarm condition.

The controller 14 is able to communicate to each of the detectors 38-42 of the hazardous condition detection system 36 through the transceiver 26 and the antenna 28. Thus, the controller 14 is able to monitor the operation of the detector system 36 and can communicate information to the detectors when desired. In the embodiment of the invention illustrated, the thermostat 10 is also in communication with a gateway 46 over either a wired or wireless network connection such that the thermostat 10 can communicate to a WAN, such as the Internet. The interconnection to the Internet allows the thermostat 10 to communicate to remote locations and to be monitored/controlled from remote locations. As an example, a user can modify the temperature set points of the thermostat 10 from a remote location through the connection via the gateway 46. Likewise, if a hazardous condition is detected by the hazardous condition detection system 36, this message can be relayed to a remote location through the gateway 46.

As illustrated in the FIGURE, the combination thermostat 10 includes a radio receiver 48 having its own antenna 50. Although the radio receiver 48 is described in the specification as being a NOAA radio, it should be understood that the radio receiver 48 can be configured to receive radio broadcasts at various different frequencies. Thus, if the receiving frequency of the radio receiver is selected to be the NOAA frequency, the radio receiver will receive NOAA broadcasts. However, it the radio receiver is configured to receive different frequencies, the radio receiver can function to receive other types of warning radio broadcasts. As an example, it is contemplated that the receiving frequency for the radio receiver 48 could be configured to receive warning radio broadcasts such as "Amber" alerts or other types of warning messages, such as from the Department of Homeland Security.

The radio receiver 48 is in communication with the controller 14 such that when the radio receiver detects an emergency warning, such as from NOAA, this information is relayed to the controller 14. Upon receipt of the weather or other warning information, the controller 14 communicates such an alarm condition to external alarm devices, when available, through the transceiver 26 and an RF signal sent by the antenna 28. In a preferred embodiment of the invention, the alarm signal is sent to the hazardous condition detection system 36 through the wireless RF signal, thereby causing each of the detectors 38-40 to generate some type of warning alarm. In an alternate embodiment of the invention, the thermostat can communicate with the detection system 36 utilizing Powerline Carrier communication (PLC) techniques.

Although each of the detectors 38-40 includes at least one type of temporal alarm pattern, such as the standard patterns for the detection of smoke or CO, it is contemplated that the detectors could be configured to generate a different sounding warning alarm upon receipt of a weather-related alarm message. It is contemplated that the alarm signal to any one of the detectors 38-42 may occur only upon the highest level of warning, such as during the presence of a tornado, but that alarm messages may not be sent during less severe weather situations, such as heavy thunderstorms. The level of control for how alarming will occur in each home can be program controlled and adapted to individual homeowner specifications. This program control may include, but is not limited to, the severity level and methods of alarming, modification to the methods of alarming depending on the time of day or day of week, locations and types of remote alarm devices enabled and durations and patterns of alarm signaling.

In addition to the alarm signal sent to the remote alarm devices, the controller 14 also communicates to an internal audio transducer 52. The audio transducer 52 is included within the thermostat housing 12 to warn users of an emergency alarm broadcast and will deliver clear voice messages during short periods of weather alerts. Preferably, the audio transducer 52 will be capable of emitting a tone of 90 db. The controller 14 is also connected to a strobe light 54 that also has the intent of warning users of emergency alert broadcasts. The strobe light 54 is a small, bright light that will pulse on and off when a new alert is received by the radio receiver. The strobe light 54 can remain active until a predetermined time has expired or upon the user acknowledging the alert by the push of a button on the user interface 20.

The thermostat 10 can also include a series of LEDs 56 that provide a visual indicator to notify the occupant of an alert condition as well as the operation of an HVAC system. Standard colors used by similar NOAA weather radios include a red LED 58, an orange LED 60 and a yellow LED 62 that indicate various levels of weather warnings.

Although the radio receiver 48 is described as receiving weather-type information from the NOAA public broadcast system, it is also contemplated that the radio receiver 48 could receive other types of emergency broadcast information, such as alerts or warnings sent by the Homeland Security Office. Although this type of warning system is currently not in existence, it is contemplated that the radio receiver 48 could be configured to receive emergency broadcast messages on various different frequencies, depending upon the changing emergency network environment. Additionally, it is contemplated that the radio receiver could also receive other types of warning messages, such as an "Amber" alert.

In the embodiment of the invention illustrated, the radio receiver 48 includes a digital tuner that allows the user, through the user interface 20, to specify which radio transmission frequency the radio is tuned to. This allows the user to maximize reception and select the type of warning the thermostat 10 is configured to receive.

The display 18 included on the thermostat 10 is preferably a flexible LCD user interface display that includes on-screen messaging. The display 18 allows the ability to display alert messages and notices on the screen and facilitates messaging for the hearing impaired.

Although both antennas 28 and 50 are shown as external devices, it is contemplated that these devices could be combined and could be internal to the thermostat housing 10.

The NOAA weather broadcast system uses several channels or frequencies in the 162 MHz range for providing weather information throughout the U.S., to provide line of sight reception capability for receivers tuned to the appropriate frequency or frequencies. Range is generally on the order of fifty miles, depending upon terrain. The appropriate channel or frequency for providing the best reception in a given area is selected either automatically by the radio receiver 48 or by means of the user interface 20. Alternatively, a remote external keypad may be used, which communicates with the transceiver 26 by means of RF, infrared, or other electromagnetic frequencies, ultrasonic frequencies, or a hard wired cable, may be used.

The NOAA system uses a system called SAME (Specific Area Message Encoding), which encodes each broadcast to cover only a certain applicable area. Radio receivers, which have been programmed to receive a different SAME code will not receive a given SAME code, even if those other receivers are within reception range of the broadcast. The programming codes are known as FIPS, or Federal Information Processing System, codes. The FIPS codes are generally ordered on a county wide basis within each state, but larger counties, or areas where relatively localized weather phenomena occur from time to time, can be broken down into smaller areas. The area covered by each specific FIPS coded broadcast, and the areas relevant to each specific FIPS code, are determined by NOAA.

Accordingly, the present combination thermostat and severe weather warning device invention includes means for setting the FIPS code for the receiver NOAA radio 48, such as by use of the user interface 20 or remote keypad which is also used to select the appropriate frequency of the receiver. The FIPS code being entered is displayed on the display 18, just as the selected frequency, which was entered, was displayed. It should be noted that this display, and any other display provided with the present invention, may be backlighted for legibility in darkness, if so desired, with electrical power for the display lighting being provided by the common power supply 24.

When a weather broadcast incorporating the selected FIPS code is received by the NOAA radio 48, the message is output to the controller 14. In the event of a severe weather warning (severe thunderstorms in the immediate area, tornado sightings in the immediate area, etc.) an alarm signal is broadcast and a written message is shown on the display 18. The speaker or sound emitting means 52 integrated within the housing 12 transmits this audible alarm to users of the present device.

The NOAA severe weather radio system provides for more than only severe weather broadcasts. The system also provides for dissemination of weather watches (e.g., severe thunderstorms and/or tornadoes forecast for a given area, etc.) and general weather broadcasts for a given area, as well. Each of these different types of weather information (weather warnings, weather watches, and broadcast statements of the weather reported or forecast for the area) is accompanied by a specific signal, using the SAME technology. Accordingly, each specific signal may be used to activate a specific type of annunciator to alert a user as to the specific type of weather information being received. For example, the red LED 58 could be activated to indicate a severe weather warning broadcast being received, an orange LED 60 for a weather warning, and a yellow LED 62 for general weather information or statements.

The specific signal broadcast over the NOAA weather broadcast system could be used to display a stored message (e.g., "THUNDERSTORM," "TORNADO," "FLASH FLOOD," etc.) on the display 18.

Accordingly, the present combination thermostat serves to provide great peace of mind for a person using the device, and the timely weather messages provided may serve to provide sufficient notice to a user of the device to prevent or reduce property damage due to severe weather, in addition to its potential life saving benefits including Homeland Security and Amber alerts. The combining of two devices providing warnings of potentially life threatening conditions into a single device, provides a much needed means of providing warning means for alerting persons of such conditions, without requiring the separate purchase and installation of two different and independent warning devices, as has been the case in the past. The cost savings of combining the two devices into a single housing using a common electrical power supply, as well as the savings of time in installing only a single device, will prove very attractive to the person requiring such warning devices in their residence and/or workplace, as well as other structures.

As illustrated in the FIGURE, the thermostat 10 also communicates through a wireless communication system to a series of indoor sensors, including temperature or humidity sensors 58 or outdoor temperature/humidity sensors 60. When the controller receives the information from the sensors 58, 60 the controller can display this information on the display 18 of the combination thermostat 10. In this manner, the combination thermostat 10 connects as a wireless weather station in addition to performing the conventional thermostat functions.

In addition to acting as a simple wireless weather station, thermostat 10 can also perform its thermostat functions based upon the temperature and or humidity readings from different locations either within the building or from the outdoors. As an example, during normal business hours, the controller 14 may control the temperature within a building based upon the temperature and or humidity on the main floor of the building. During evening and sleeping hours, the controller 14 may control the temperature based upon the sensed temperature and/or humidity from a remote wireless sensor located within the bedroom of the homeowner. Thus, the single thermostat 10 can control the comfort levels within remote rooms through the use of the wireless sensors 58.

The thermostat, using either the radio receiver 48 or the WAN 46 network interconnection option, is capable of communicating with and receiving real time energy price data from an energy supplier, which is envisioned to be part of the evolving energy marketplace. By receiving real time price signals, the thermostat can directly control the operation of the environmental conditions system in the home which is normally the largest energy consumption point. The reaction to pricing signals is controlled based on the parameters entered into the thermostat by the user which directly relate to their willingness to pay. By combining degrees of comfort with relative costs of energy, the thermostat can manage the indoor environment in an ecologically and financially responsible manner without requiring any intervention on the part of the homeowner. This energy control and management function can be expanded to include other networked appliances in the home that are price responsive. The thermostat through the in-home RF network created by the transmitter 26 and antenna 28 can generate price responsive messages to in home appliances causing them to take appropriate action. Other network interfaces like Powerline Carrier networks (not illustrated) may be incorporated into the thermostat and replace or supplement the RF network as needed to meet the demands of the system.

I claim:

1. A combination thermostat and warning device, comprising:

a housing mountable to a support surface;

a controller contained within the housing and operable to control the operation of a climate control device;

at least one temperature sensor in communication with the controller to sense the temperature and provide a temperature signal to the controller such that the controller can control the operation of the climate control device based upon the temperature signal;

a radio receiver disposed within the housing and operable to receive a radio broadcast from a remote source, the radio receiver being in communication with the controller; and at least one alarm indicator in communication with the controller such that the controller can activate the alarm indicator to generate a warning alarm upon receipt of the radio broadcast by the radio receiver, the radio receiver being configured to receive energy pricing information such that the controller is operable to control the operation of the climate control device based upon the energy pricing information, the energy pricing information being received over a Federally controlled frequency used to generate warning radio broadcasts.

2. The combination thermostat and warning device of claim 1 wherein the alarm indicator is a hazardous condition detection system located remotely from the device, the hazardous condition detection system including at least one hazardous condition detector having an audible alarm such that the audible alarm can be actuated by the controller.

3. The combination thermostat and warning device of claim 2 wherein the controller communicates with the hazardous condition detection system using wireless communication.

4. The combination thermostat and warning device of claim 2 wherein the controller communicates with the hazardous condition detection system using Power Line Communication.

5. The combination thermostat and warning device of claim 2 wherein each hazardous condition detector is operable to generate a warning alarm distinct from a first alarm generated upon detection of the hazardous condition.

6. The combination thermostat and warning device of claim 1 further comprising a visual display device disposed within the housing and in communication with the controller, wherein the controller is operable to display a warning message on the visual display device based upon the radio broadcast.

7. The combination thermostat and warning device of claim 6 wherein the alarm indicator is disposed within the housing.

8. The combination thermostat and warning device of claim 7 wherein the alarm indicator includes a visual warning device and an audible warning device each actuated by the controller.

9. The combination thermostat and warning device of claim 8 wherein the audible warning device is operable to annunciate either a voice message or a horn pattern.

10. The combination thermostat and warning device of claim 1 further comprising: an electrical external power supply for providing electrical power to at least the controller and the radio receiver; and a battery power supply disposed within the housing to provide electrical power to at least the controller and the radio receiver upon interruption of the external power supply.

11. The combination thermostat and warning device of claim 1 wherein the radio receiver is configured to receive a severe weather broadcast.

12. The combination thermostat and warning device of claim 11 further comprising a user interface disposed within the housing, wherein the user interface is in communication with the controller such that a Federal Information Processing System code can be entered into the controller for a geographic region through the user interface.

13. The combination thermostat and warning device of claim 1 further comprising a user interface disposed within the housing, wherein the user interface is in communication with the controller such that a receiving frequency for the radio receiver can be selected through the user interface.

14. A combination thermostat and warning device, comprising:

a housing mountable to a support surface;

a controller contained within the housing and operable to control the operation of a climate control device;

at least one temperature sensor in communication with the controller to sense the temperature and provide a temperature signal to the controller such that the controller can control the operation of the climate control device based upon the temperature signal;

a radio receiver disposed within the housing and operable to receive a warning radio broadcast from a remote source, the radio receiver being in communication with the controller;

a transceiver disposed within the housing and coupled to the controller, the transceiver being operable to transmit an alarm signal from the controller; and at least one remote alarm indicator operable to receive the alarm signal from the transceiver and generate a warning alarm, the radio receiver being configured to receive energy pricing information such that the controller is operable to control the operation of the climate control device based upon the energy pricing information, the energy pricing information being received over a Federally controlled frequency used to generate warning radio broadcasts.

15. The combination thermostat and warning device of claim 14 wherein the remote alarm indicator is a hazardous condition detection system located remotely from the device, the hazardous condition detection system including at least one hazardous condition detector having an audible alarm such that the audible alarm is actuated upon receipt of the alarm signal.

16. The combination thermostat and warning device of claim 15 wherein the alarm signal is an RF signal.

17. The combination thermostat and warning device of claim 15 wherein each hazardous condition detector generates the warning alarm that is distinct from a first alarm generated upon detection of a hazardous condition.

18. The combination thermostat and warning device of claim 14 further comprising a visual display device disposed within the housing and in communication with the controller, wherein the controller is operable to display a warning message on the visual display device based upon the warning radio broadcast.

19. The combination thermostat and warning device of claim 14 further comprising at least one remote temperature sensor located remotely from the housing and operable to generate a remote temperature signal, wherein the transceiver receives the remote temperature signal and relays the remote temperature signal to the controller such that the controller is operable to control the operation of the climate control device based upon the remote temperature signal.

20. The combination thermostat and warning device of claim 14 wherein the alarm indicator is disposed within the housing.

21. The combination thermostat and warning device of claim 16 wherein the alarm indicator includes a visual device and an audible device each actuated by the controller.

22. The combination thermostat and warning device of claim 14 further comprising: an electrical external power supply for providing electrical power to at least the controller and the radio receiver; and a battery power supply disposed within the housing to provide electrical power to at least the controller and the radio receiver upon interruption of the external power supply.

23. The combination thermostat and warning device of claim 14 wherein the radio receiver is configured to receive a severe weather broadcast.

24. The combination thermostat and warning device of claim 14 further comprising a user interface disposed within the housing, wherein the user interface is in communication with the controller such that a Federal Information Processing System code can be entered into the controller for a geographic region through the user interface.

25. The combination thermostat and warning device of claim 14 further comprising a user interface disposed within the housing, wherein the user interface is in communication with the controller such that a receiving frequency for the radio receiver can be selected through the user interface.

26. The combination thermostat and warning device of claim 14 wherein the remote alarm indicator is a network of alarm devices, wherein at least one of the alarm devices is operable to receive the alarm signal from the controller and relay the alarm signal to another of the alarm devices such that the network of alarm devices defines a mesh network.

27. A thermostat device, comprising:

a housing;

a controller contained within the housing and operable to control the operation of a climate control device;

at least one temperature sensor in communication with the controller to sense the temperature and provide a temperature signal to the controller such that the controller can control the operation of the climate control device based upon the temperature signal; and a radio receiver disposed within the housing and operable to receive a radio broadcast from a remote source, the radio receiver being in communication with the controller, the radio receiver being configured to receive energy pricing information such that the controller is operable to control the operation of the climate control device based upon the energy pricing information, the energy pricing information being received over a frequency used to generate warning radio broadcasts.

28. The thermostat device, as set forth in claim 27, including at alarm generating device indicator in communication with the controller such that the controller can activate the alarm generating device to generate a warning alarm upon receipt of the radio broadcast by the radio receiver.

29. The thermostat device, as set forth in claim 28, wherein the alarm generating device is an alarm indicator located remotely from the housing.

30. The thermostat device device, as set forth in claim 28, wherein alarm generating device is located on the housing.

31. An apparatus, comprising:

a housing;

a controller contained within the housing and operable to control the operation of a device which uses energy;

a radio receiver disposed within the housing and operable to receive a radio broadcast from a remote source, the radio receiver being in communication with the controller, the radio receiver being configured to receive energy pricing information such that the controller is operable to control the operation of the device based upon the energy pricing information, the energy pricing information being received over a frequency used to generate warning radio broadcasts.

32. The apparatus, as set forth in claim 31, including at alarm generating device indicator in communication with the controller such that the controller can activate the alarm generating device to generate a warning alarm upon receipt of the radio broadcast by the radio receiver.

33. The apparatus, as set forth in claim 32, wherein the alarm generating device is an alarm indicator located remotely from the housing.

34. The apparatus, as set forth in claim 32, wherein the alarm generating device is located on the housing.

* * * * *